(12) United States Patent
Wang et al.

(10) Patent No.: US 11,895,384 B2
(45) Date of Patent: Feb. 6, 2024

(54) ACTUATOR, CAMERA MODULE AND ELECTRONIC DEVICE

(71) Applicant: Beijing Xiaomi Mobile Software Co., Ltd., Beijing (CN)

(72) Inventors: Bin Wang, Beijing (CN); Hui Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/587,221

(22) Filed: Jan. 28, 2022

(65) Prior Publication Data

US 2023/0029593 A1 Feb. 2, 2023

(30) Foreign Application Priority Data

Jul. 27, 2021 (CN) .......................... 202110852393.9

(51) Int. Cl.
*H04N 23/54* (2023.01)
*H04N 23/68* (2023.01)
(Continued)

(52) U.S. Cl.
CPC ............... *H04N 23/54* (2023.01); *G02B 3/12* (2013.01); *G02B 7/09* (2013.01); *G02B 26/004* (2013.01);
(Continued)

(58) Field of Classification Search
CPC ........ G02B 27/64; G02B 27/646; G02B 7/09; G02B 3/12; G02B 26/004; G02B 26/005;
(Continued)

(56) References Cited

U.S. PATENT DOCUMENTS 7,952,612 B2 * 5/2011 Kakkori ............. H04N 23/6812
348/208.6
10,033,917 B1 * 7/2018 Silverstein ............... G02B 7/04
(Continued)

FOREIGN PATENT DOCUMENTS

CN 109581648 A 4/2019
CN 109975973 A 7/2019
(Continued)

OTHER PUBLICATIONS

Extended European Search Report dated Aug. 3, 2022 for European Patent Application No. 22153693.1.

*Primary Examiner* — Twyler L Haskins
*Assistant Examiner* — Akshay Trehan
(74) *Attorney, Agent, or Firm* — Volpe Koenig (57) ABSTRACT

An actuator includes a seat body a stator magnet, a mover assembly and a driving chip. The stator magnet is in the seat body and is connected to the seat body; the mover assembly includes a coil circuit board, the coil circuit board includes a first electrically conductive coil, and the first electrically conductive coil, when energized, interacts with the stator magnet to drive the mover assembly and the stator magnet to move relative to each other; and the driving chip is located on the coil circuit board and is connected to the first electrically conductive coil, and is used for connecting to an external power supply circuit to supply power to the first electrically conductive coil.

20 Claims, 4 Drawing Sheets

(51) Int. Cl.
  *H04N 23/65* (2023.01)
  *G02B 7/09* (2021.01)
  *G02B 27/64* (2006.01)
  *H02K 41/035* (2006.01)
  *H04N 23/57* (2023.01)
  *G02B 26/00* (2006.01)
  *G02B 3/12* (2006.01)

(52) U.S. Cl.
  CPC ....... *G02B 27/646* (2013.01); *H02K 41/0356* (2013.01); *H04N 23/57* (2023.01); *H04N 23/65* (2023.01); *H04N 23/687* (2023.01); *H04N 23/6812* (2023.01); *G03B 2205/0007* (2013.01); *G03B 2205/0069* (2013.01)

(58) Field of Classification Search
  CPC .... G03B 2205/0069; G03B 5/02; G03B 5/04; G03B 2205/0007; G03B 2205/015; G03B 2205/0038; G03B 2205/0053; H04N 5/2253; H04N 5/2254; H04N 5/2257; H04N 5/2259; H04N 5/23241; H04N 5/23258; H04N 5/23287; H04N 23/54; H04N 23/65; H04N 23/6812; H04N 23/687; H04N 23/57; H02K 41/0354; H02K 41/0356
  See application file for complete search history.

(56) References Cited

U.S. PATENT DOCUMENTS

| | | | |
|---|---|---|---|
| 10,890,734 B1* | 1/2021 | Sharma | H02P 6/30 |
| 11,122,205 B1* | 9/2021 | Sharma | H04N 23/54 |
| 11,457,130 B2* | 9/2022 | Yang | H04N 23/54 |
| 2007/0047942 A1* | 3/2007 | Chang | H04N 23/67 |
| | | | 348/E5.045 |
| 2016/0070115 A1* | 3/2016 | Miller | G03B 5/02 |
| | | | 359/557 |
| 2016/0073028 A1* | 3/2016 | Gleason | H04N 23/55 |
| | | | 359/557 |
| 2016/0360111 A1* | 12/2016 | Thivent | H04N 23/55 |
| 2017/0351159 A1* | 12/2017 | Kudo | H04N 23/57 |
| 2018/0173080 A1* | 6/2018 | Enta | H04N 23/57 |
| 2018/0203203 A1* | 7/2018 | Lee | H04N 23/687 |
| 2019/0014258 A1* | 1/2019 | Horesh | H04N 23/71 |
| 2019/0020822 A1* | 1/2019 | Sharma | H02K 41/0354 |
| 2019/0174044 A1* | 6/2019 | Honsho | G03B 5/00 |
| 2021/0321024 A1* | 10/2021 | Song | H04N 23/55 |
| 2022/0206287 A1* | 6/2022 | Osaka | G03B 30/00 |

FOREIGN PATENT DOCUMENTS

| | | | | |
|---|---|---|---|---|
| CN | 112804417 A | * | 5/2021 | ............ H04N 23/55 |
| CN | 112804417 A | | 5/2021 | |
| CN | 112886788 A | | 6/2021 | |

* cited by examiner

ACTUATOR, CAMERA MODULE AND ELECTRONIC DEVICE

CROSS REFERENCE TO RELATED APPLICATION

The application claims priority to Chinese Patent Application No. 202110852393.9 filed on Jul. 27, 2021. The entire contents of the above-listed application are hereby incorporated by reference for all purposes.

BACKGROUND

With the science and technology developed, users have higher requirements on the photographing function and the image quality of terminal devices. In general, the camera can be configured with a focusing function and an anti-shaking function to improve the image quality.

In the related art, interaction between the magnet and the coil in the motor is generally used to drive the lens in the camera to move for focusing or anti-shaking. In addition, a driving chip independent of the motor also needs to be configured and connected to the pin that leads out of the coil in the motor, which hinders the manufacture.

SUMMARY

The disclosure relates to the technical field of terminals, and relates to an actuator, a camera module and an electronic device.

According to a first aspect of the disclosure, an actuator is provided, and including:

a seat body;

a stator magnet that is in the seat body and is connected to the seat body;

a mover assembly, including a coil circuit board, the coil circuit board includes a first electrically conductive coil, and the first electrically conductive coil, when energized, interacts with the stator magnet to drive the mover assembly and the stator magnet to move relative to each other; and a driving chip that is located on the coil circuit board and is connected to the first electrically conductive coil, and is used for connecting to an external power supply circuit to supply power to the first electrically conductive coil.

According to a second aspect of the disclosure, a camera module is provided, and including:

an actuator according to the first aspect of the disclosure; and a lens, being assembled on a seat body of the actuator and connected to a mover assembly.

According to a third aspect of the disclosure, an electronic device is provided, and including a camera module according to the second aspect of the disclosure.

It is to be understood that the general description above and the following detailed description are exemplary and explanatory only, and are not intended to limit the disclosure.

BRIEF DESCRIPTION OF THE DRAWINGS

The accompanying drawings herein, which are incorporated in the description as a part of the description, illustrate the embodiments of the disclosure and are used to explain the principles of the disclosure together with the description.

DETAILED DESCRIPTION

The embodiments will be described in detail herein, examples of which are shown in the accompanying drawings. When the following descriptions relate to the accompanying drawings, unless otherwise specified, the same numeral in different accompanying drawings denotes the same or similar element. The implementations described in the following embodiments do not denote all implementations consistent with the disclosure. On the contrary, they are merely examples of an apparatus and a method consistent with some aspects of the disclosure as detailed in the appended claims.

The terms used in the disclosure are for the purpose of describing the embodiments, instead of limiting the disclosure. The singular forms such as "a", "the" and "this" used in the disclosure and the appended claims are also intended to include the plural forms, unless otherwise clearly stated in the context. It should also be understood that the term "and/or" used herein refers to and includes any of one or more of the associated listed items or all possible combinations.

It should be understood that though the terms first, second, third, etc. may be used in the disclosure to describe various information, the information should not be limited thereto. These terms are used to distinguish information of the same type from each other. For example, the first information may also be referred to as the second information, and similarly, the second information may also be referred to as the first information, without departing from the scope of the disclosure. The word "if" as used herein, may be interpreted as "at the time of", "when" or "in response to a determination" depending on the context.

Figures 1, 2:
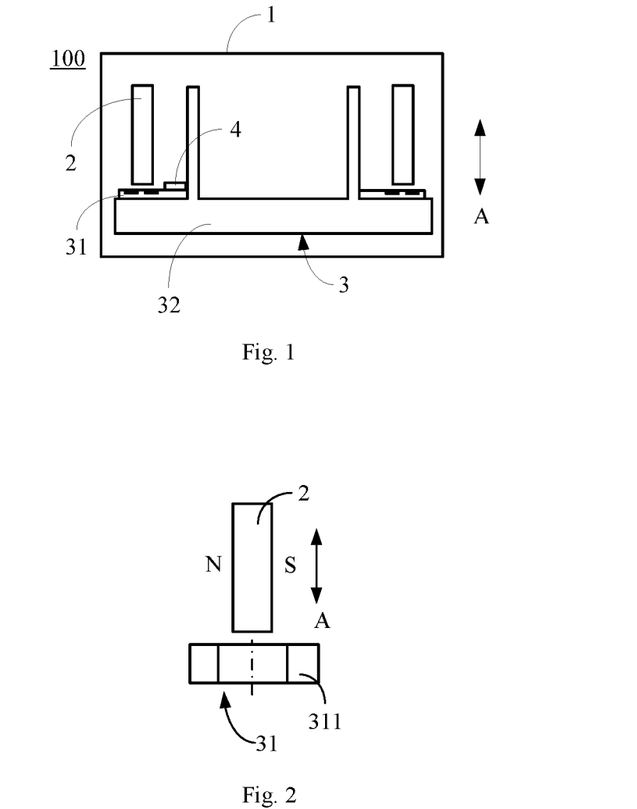
FIG. 1 is a schematic sectional view of an actuator according to an embodiment of the disclosure.
FIG. 2 is a schematic diagram of a relative positional relation between a stator magnet and a first electrically conductive coil according to an embodiment of the disclosure.

FIG. 1 is a schematic cross-sectional view of an actuator 100 according to an embodiment. As shown in FIG. 1, the actuator 100 includes a seat body 1, a stator magnet 2, a mover assembly 3, and a driving chip 4. The stator magnet 2, the mover assembly 3, and the driving chip 4 may be all arranged in the seat body 1, and the stator magnet 2 may be connected to an inner wall of the seat body 1, so that the stator magnet 2 is fixedly connected to the seat body 1, and a stable relative positional relation may be maintained there between. The mover assembly 3 is movably arranged in the seat body 1, and the mover assembly 3 includes a coil circuit board 31. The coil circuit board 31 includes a first electrically conductive coil 311, and the driving chip 4 is arranged on the coil circuit board 31. The driving chip 4 may be connected, through a circuit integrated in the coil circuit board 31, to the first electrically conductive coil 311, and the driving chip 4 may be electrically connected to an external power supply circuit, so that an electric signal provided by the external power supply circuit may supply, through the driving chip 4, power to the first electrically conductive coil 311, and an energized first electrically conductive coil 311 interacts with the stator magnet 2 to generate an acting force acting on the mover assembly 3 to drive the mover assembly 3 to move relative to the stator magnet 2.

The external power supply circuit may be a circuit configured outside the actuator 100 for power supply and signal transmission for the driving chip 4. For example, the external power supply circuit may be a circuit board provided in the camera module, and the circuit board is used to supply power to the driving chip 4, so as to realize the operation of the driving chip 4.

When configuring the actuator 100 to a camera module, a lens of the camera module can be connected to the mover assembly 3, so as to utilize movement of the mover assembly 3 to adjust a position of the lens, so as to realize a focusing function or an anti-shaking function of the camera module. Moreover, in the actuator 100, the driving chip 4 is arranged in the actuator 100, and the driving chip 4 is connected, through the circuit integrated in the coil circuit board 31, to the first electrically conductive coil 311. Compared with the solution in the related art that a driving chip 4 is arranged independently of an actuator 100, so that a plurality of pins are needed to be led out of an inside of the actuator 100 to be connected to the driving chip 4, in the technical solution of the disclosure, it is not necessary to provide a pin for connecting the first electrically conductive coil 311 to the driving chip 4, so as to reduce the number of pins of the driving chip 4, and the number of terminals led out of the actuator 100, and reducing process difficulty.

Figure 5:
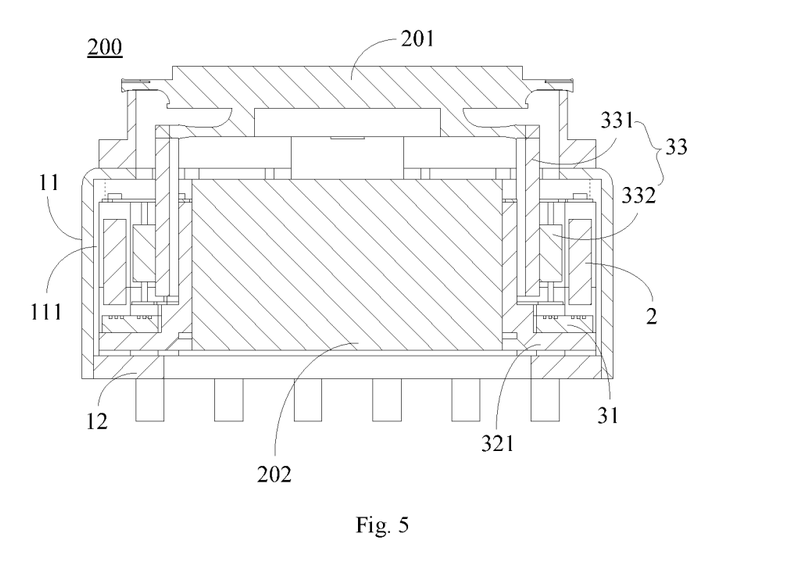
FIG. 5 is a schematic diagram of a section C-C of the camera module in FIG. 4.
Figure 6:
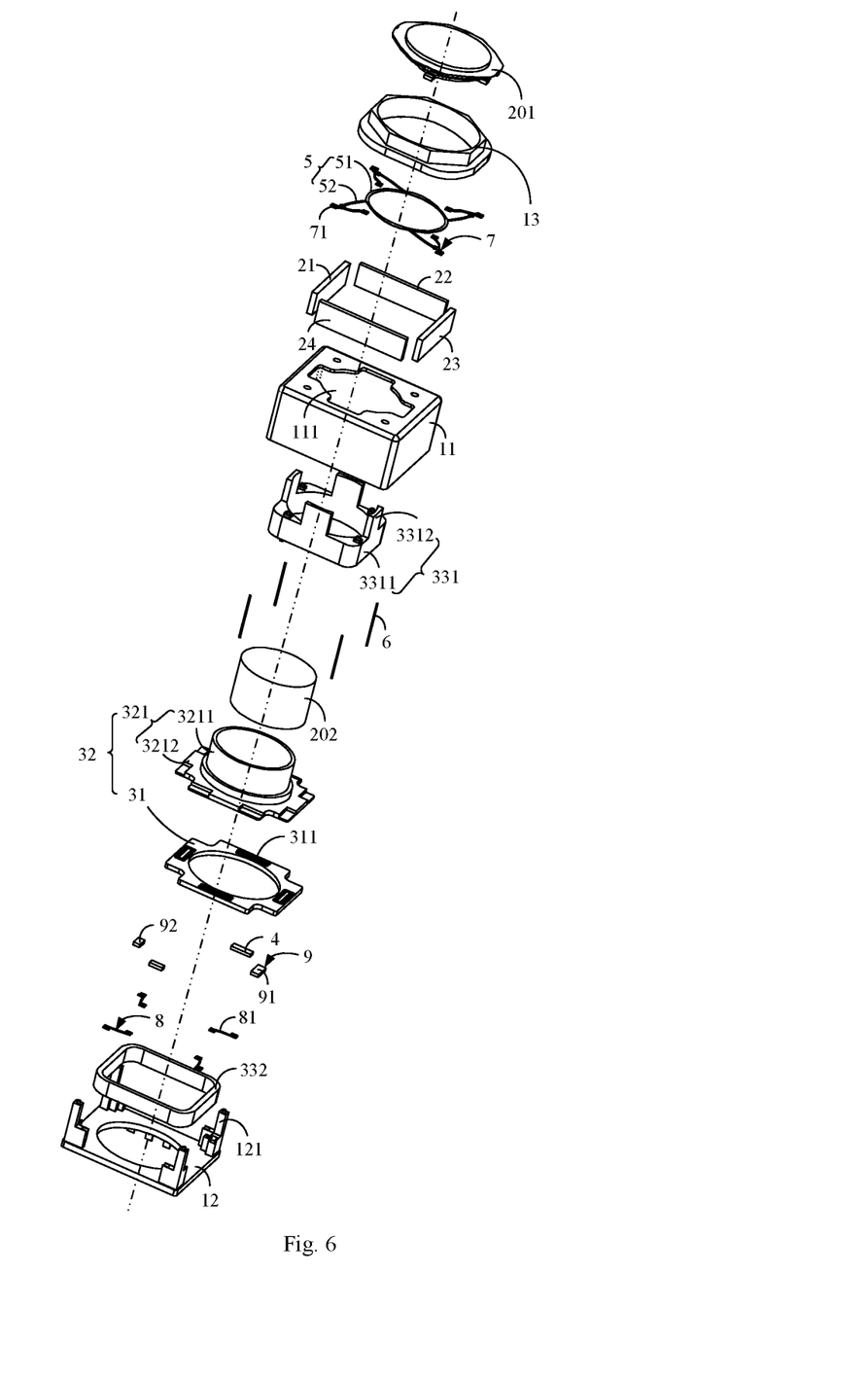
FIG. 6 is a schematic exploded view of the camera module in FIG. 4.

In some embodiments, the actuator 100 may include a single mover assembly 3. For example, as shown in FIG. 1, FIG. 5 and FIG. 6, the mover assembly 3 includes a first mover assembly 32. The first mover assembly 32 may include a first mounting seat 321 and a coil circuit board 31, the first mounting seat 321 is movably arranged in the seat body 1, and the first mounting seat 321 is capable of being used for fixing the lens of the camera module configured with the actuator 100. The coil circuit board 31 may be arranged on the first mounting seat 321 around a first direction (as shown by an arrow A in FIG. 1), the coil circuit board 31 may be arranged towards any end, in the first direction, of the stator magnet 2, and as shown in FIG. 1, the coil circuit board 31 is located below the stator magnet 2. Based on this, when the first electrically conductive coil 311 of the coil circuit board 31 interacts with the stator magnet 2, the first mover assembly 32 is driven to translate in a reciprocating manner in a plane perpendicular to the first direction. When the first direction is an optical axis direction of the camera module configured with the actuator 100, the first mover assembly 32 translates in a reciprocating manner in the plane perpendicular to the first direction, so that the anti-shaking function of the camera module may be realized. Or, the first electrically conductive coil 311 interacts with the stator magnet 2 to drive the first mover assembly 32 to move in a reciprocating manner in the first direction. When the first direction is the optical axis direction of the camera module configured with the actuator 100, the focusing function of the camera module may be realized.

In some embodiments, the first mounting seat 321 may include a first enclosure wall 3211 and an extension part 3212 extending outwards from the first enclosure wall 3211. The first enclosure wall 3211 may be used for assembling the lens of the camera module, for example, the lens may penetrate an inside of the first enclosure wall 3211, and the coil circuit board 31 and the extension part 3212 may be stacked to enable the extension part 3212 to carry the coil circuit board 31, so as to mount the coil circuit board 31. The coil circuit board 31 may be not arranged on an outer side of the first enclosure wall 3211, so that an electronic component may be assembled on the coil circuit board 31 conveniently, without causing interference between the electronic component and other parts of the actuator 100. The embodiment shown in FIG. 1 is an embodiment described on the premise that the coil circuit board 31 is arranged around the outer side of the first mounting seat 321, and in other embodiments, the coil circuit board 31 is annularly arranged in a first mounting seat 321, which is not limited in the disclosure.

The detailed description will be made below with respect to the case in which the actuator 100 includes the single mover assembly 3, the first mover assembly 32 moves in a reciprocating manner in the first direction or the first mover assembly 32 translates in the plane perpendicular to the first direction, as set forth in the embodiment described above.

In some embodiments, the actuator 100 may include a plurality of stator magnets 2. The plurality of stator magnets 2 is arranged at intervals around the first mounting seat 321 around the first direction, the coil circuit board 31 includes a plurality of first electrically conductive coils 311, the plurality of first electrically conductive coils 311 are in one-to-one correspondence with the plurality of stator magnets 2, and for example, as shown in FIG. 2, each of the stator magnets 2 and a corresponding first electrically conductive coil 311 is capable of being arranged in the first direction. As shown in FIG. 2, a magnetic pole arrangement direction of each of the stator magnets 2 is perpendicular to the first direction, and an axial direction of each of the first electrically conductive coils 311 is parallel to the first direction. Based on this, when any one of the first electrically conductive coils 311 is energized, any first electrically conductive coil 311 may interact with a stator magnet corresponding to the same to generate an Ampere force with a component force perpendicular to the first direction, and a component force (to be described later) parallel to the first direction can limited by other structures, so that the first mover assembly 32 may translate in a reciprocating mode in a plane perpendicular to the first direction. It will be understood that the first mover assembly 32 may need to move to different positions in one plane for anti-shaking, and a position, in one plane, of the first mover assembly 32 may be represented through displacement in two directions perpendicular to each other in the plane. In order to drive the first mover assembly 32 to displace in the two directions perpendicular to each other in the plane, magnetic pole arrangement directions of at least two stator magnets 2 of the plurality of stator magnets 2 may be arranged to be perpendicular to each other, and two acting forces perpendicular to each other in the same plane may be applied to the first mover assembly 32 to drive the first mover assembly 32 to move to various positions in the plane. A direction of the acting force may be changed by changing a direction of a current in the first electrically conductive coil 311, so as to move the first mover assembly 32 forward and backward. Magnitude of the acting force applied to the first mover assembly 32 may be adjusted by changing magnitude of the current in the first electrically conductive coil 311 for fine adjustment.

Figure 3:
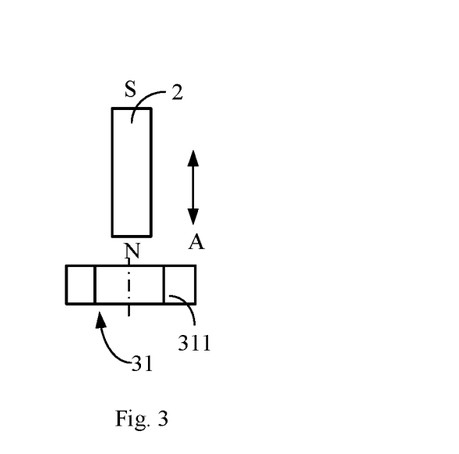
FIG. 3 is a schematic diagram of another relative positional relation between the stator magnet and the first electrically conductive coil according to an embodiment of the disclosure.

In some other embodiments, the actuator 100 may include a plurality of stator magnets 2. The plurality of stator magnets 2 is arranged around the first mounting seat 321 at intervals around the first direction, the coil circuit board 31 includes a plurality of first electrically conductive coils 311, the plurality of first electrically conductive coils 311 are in one-to-one correspondence with the plurality of stator magnets 2, and for example, as shown in FIG. 3, each of the stator magnets 2 and a corresponding first electrically conductive coil 311 are capable of being arranged in the first direction. As shown in FIG. 3, magnetic pole arrangement directions of the stator magnets 2 are parallel to the first direction, and axial directions of the first electrically conductive coils 311 are parallel to the first direction, so that a magnetic field generated when the first electrically conductive coil 311 is energized may interact with a magnetic field of the stator magnet 2, and relying on a principle that like poles repel and opposite poles attract each other, the first mover assembly 32 is driven to move in a reciprocating manner in the first direction, so as to realize the focusing function of the camera module configured with the actuator 100. In order to stably move the first mover assembly 32, an even number of stator magnets 2 may be arranged are opposite to each other two-by-two. When two first electrically conductive coils 311 arranged opposite each other are energized with currents in the same direction, the two first electrically conductive coils 311 interact with corresponding stator magnets 2 to generate acting forces in the same direction, so that the first mover assembly 32 stably moves in the first direction, and the first mover assembly 32 is prevented from being inclined, so as to avoid adversely affecting the photograph. A direction of the acting force may be changed by changing a direction of a current in the first electrically conductive coil 311, so that the first mover assembly 32 moves upward or downward in FIG. 3. Magnitude of the acting force applied to the first mover assembly 32 may be adjusted by changing magnitude of the current in the first electrically conductive coil 311 for fine adjustment.

The magnetic pole arrangement direction mentioned above and below is the polarity arrangement direction. As shown in FIG. 2 and FIG. 3, the magnetic pole arrangement direction is the arrangement direction from N pole to the S pole of the stator magnet 2, or the arrangement direction from S pole to the N pole of the stator magnet 2.

In each embodiment described above, the actuator 100 includes the single mover assembly 3, and the single mover assembly 3 may subsequently realize the focusing function or the anti-shaking function of the camera module configured with the actuator 100. In other embodiments, the actuator 100 may also include a plurality of mover assemblies 3, so that the camera module configured with the actuator 100 have both the focusing function and the anti-shaking function. In order to explain the technical solution in detail, with the embodiment in which an actuator 100 is configured in a camera module as an example, a structure of the actuator 100 and a connection relation between the actuator 100 and lens will be described in detail.

Figure 4:
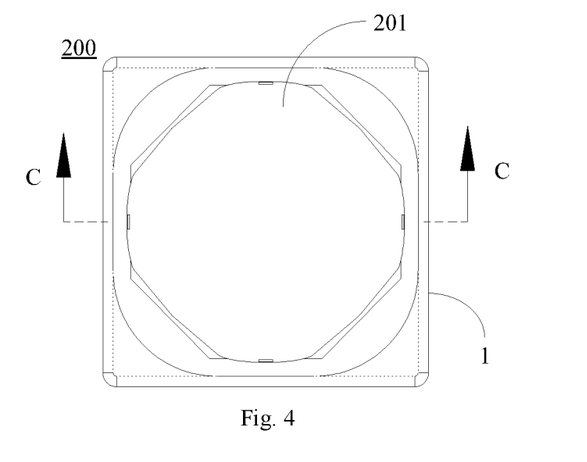
FIG. 4 is a top view of a camera module according to an embodiment of the disclosure.

As shown in FIGS. 4-6, the actuator 100 includes a first mover assembly 32 and a second mover assembly 33, and the lens of the camera module 200 includes a solid-state lens 202 and liquid lens 201, optical axis directions of the solid-state lens 202 and the liquid lens 201 being a first direction. The first mover assembly 32 is connected to the solid-state lens 202, and the second mover assembly 33 is connected to the liquid lens 201. The liquid lens 201 may include a liquid lens or a gaseous lens, which is not limited in the disclosure. The first mover assembly 32 drives the solid-state lens 202 to move in a plane perpendicular to the first direction for anti-shaking, and the second mover assembly 33 moves in the first direction to adjust curvature of the liquid lens 201 for focusing. In the technical solution, the first mover assembly 32 moves the solid-state lens 202, and the curvature of the liquid lens 201 is adjusted through the second mover assembly 33, so that the focusing function and the anti-shaking function of the camera module 200 can be independently realized, so as to avoid mutual influence between a focusing process and an anti-shaking process, and improving an image quality.

In the embodiment, the first mover assembly 32 may include a first mounting seat 321 and a coil circuit board 31, the first mounting seat 321 is movably arranged in a seat body 1, and the first mounting seat 321 is capable of being connected to the solid-state lens 202. The coil circuit board 31 may be arranged on an outer side of the first mounting seat 321 around the first direction (as shown by an arrow A in FIG. 1), and the coil circuit board 31 may be arranged towards any end, in the first direction, of a stator magnet 2. The actuator 100 may further include a plurality of stator magnets 2, the coil circuit board 31 may include a plurality of first electrically conductive coils 311, and the plurality of first electrically conductive coils 311 are in one-to-one correspondence with the plurality of stator magnets 2. Magnetic pole arrangement directions of the stator magnets 2 are perpendicular to the first direction, and axial directions of the first electrically conductive coils 311 are parallel to the first direction, so that when the first electrically conductive coil 311 of the coil circuit board 31 interacts with the stator magnet 2, the first mover assembly 32 may be driven to translate in a reciprocating manner in a plane perpendicular to the first direction. The first mover assembly 32 translates in a reciprocating manner in the plane perpendicular to the first direction, so as to realize the anti-shaking function of the camera module 200.

The second mover assembly 33 may include a second mounting seat 331 and a second electrically conductive coil 332 connected to the second mounting seat 331. The second mounting seat 331 may be used for being fixedly connected to the liquid lens 201, and the second electrically conductive coil 332 may be connected to a driving chip 4. The second electrically conductive coil 332 is energized to interact with the stator magnet 2 to drive the second mover assembly 33 to translate in a reciprocating manner in the first direction, so as to realize the focusing function of the camera module 200. For example, the second electrically conductive coil 332 may include a first lead end and a second lead end, the driving chip 4 includes a first pin and a second pin, the first pin is connected to the first lead end, and the second pin is connected to the second lead end, so as to input a current from the first lead end or the second lead end of the second electrically conductive coil 332, and outputting same from the other end for energization.

An example of implementation of the anti-shaking function of the camera module 200 will be described in detail below.

The first mounting seat 321 may include a first enclosure wall 3211 and an extension part 3212 extending outwards from the first enclosure wall 3211. The first enclosure wall 3211 may be used for assembling the solid-state lens 202 of the camera module 200, for example, the solid-state lens 202 may penetrate an inside of the first enclosure wall 3211, and the coil circuit board 31 and the extension part 3212 may be stacked to enable the extension part 3212 to carry the coil circuit board 31, so as to mount the coil circuit board 31. The actuator 100 may include a plurality of stator magnets 2 arranged towards the extension part 3212, such as a first stator magnet 21, a second stator magnet 22, a third stator magnet 23, and a fourth stator magnet 24. The first stator magnet 21, the second stator magnet 22, the third stator magnet 23, and the fourth stator magnet 24 may be arranged around the first mounting seat 321 at intervals around the first direction. The coil circuit board 31 may include four first electrically conductive coils 311, and the four first electrically conductive coils 311 are capable of being in one-to-one correspondence with the first stator magnet 21, the second stator magnet 22, the third stator magnet 23, and the fourth stator magnet 24.

The first stator magnet 21 and the third stator magnet 23 are arranged opposite to each other, the second stator magnet 22 and the fourth stator magnet 24 are arranged opposite to each other, a magnetic pole arrangement direction of the first stator magnet 21 being perpendicular to magnetic pole arrangement directions of the second stator magnet 22 and the fourth stator magnet 24, and parallel to a magnetic pole arrangement direction of the third stator magnet 23, so that the first mover assembly 32 can translate in the plane perpendicular to the first direction. The description here is made on the premise that the actuator 100 includes four stator magnets 2, that is, the first stator magnet 21, the second stator magnet 22, the third stator magnet 23, and the fourth stator magnet 24. In other embodiments, the actuator 100 may also include other numbers of stator magnets 2, which is not limited by the disclosure.

An acting force with a component force perpendicular to the first direction and an acting force parallel to the first direction may be generated under an interaction between the stator magnet 2 and the first electrically conductive coil 311. In order to prevent the first mover assembly 32 from moving in the first direction, the actuator 100 includes an elastic member 5 and a plurality of suspension wires 6 arranged in the first direction. For example, in the embodiment shown in FIG. 6, the actuator 100 includes four suspension wires 6. The elastic member 5 includes an enclosure body 51 and a plurality of elastic arms 52 extending from the enclosure body 51, the enclosure body 51 is connected to the first mounting seat 321, each of the elastic arms 52 extend toward an outside of the enclosure body 51, one end of each of the suspension wires 6 is connected to one end, away from the enclosure body 51, of any elastic arm 52, and the other end of each of the suspension wires 6 is connected to a bottom of the seat body 1, so that rigidity, in the first direction, of the plurality of suspension wires 6 may be adjusted to prevent the first mover assembly 32 from moving in the first direction. Structures of the elastic member 5 and the suspension wire 6 may also be applied to the embodiment shown in FIG. 2, and similarly, a structure of the first mounting seat 321 and an arrangement manner of the stator magnet 2 can be applied to the embodiment shown in FIG. 2.

The way to implement the focusing function of the camera module 200 will be described in detail below.

The second mounting seat 331 may include a second enclosure wall 3311. The second enclosure wall 3311 may enclose a part of the first mounting seat 321. For example, the second enclosure wall 3311 may enclose an outer side of the first enclosure wall 3211, and the second electrically conductive coil 332 encloses an outer side of the second enclosure wall 3311. Both the second enclosure wall 3311 and the second electrically conductive coil 332 are located above the extension part 3212 of the first mounting seat 321. The first stator magnet 21, the second stator magnet 22, the third stator magnet 23, and the fourth stator magnet 24 are all arranged on one side, away from the second enclosure wall 3311, of the second electrically conductive coil 332, that is, the stator magnet 2 and the second electrically conductive coil 332 may be arranged in a nest manner in a direction perpendicular to the first direction, and an axial direction of the second electrically conductive coil 332 is parallel to the first direction. Based on this, the first stator magnet 21 interacts with a portion, close to the first stator magnet 21, of the second electrically conductive coil 332 to generate a component force in the first direction. The second stator magnet 22 interacts with a portion, close to the first stator magnet 21, of the second electrically conductive coil 332 to generate a component force in the first direction. The third stator magnet 23 interacts with a portion, close to the first stator magnet 21, of the second electrically conductive coil 332 to generate a component force in the first direction. The fourth stator magnet 24 interacts with a portion, close to the first stator magnet 21, of the second electrically conductive coil 332 to generate a component force in the first direction. Thus, the second mounting seat 331 can be driven to move in the first direction. Since the second mounting seat 331 is connected to the liquid lens 201, the second mounting seat 331 moves in the first direction to act on fluid in the liquid lens 201 to deform the fluid, so as to adjust the curvature of the liquid lens 201 for focusing.

Figure 7:
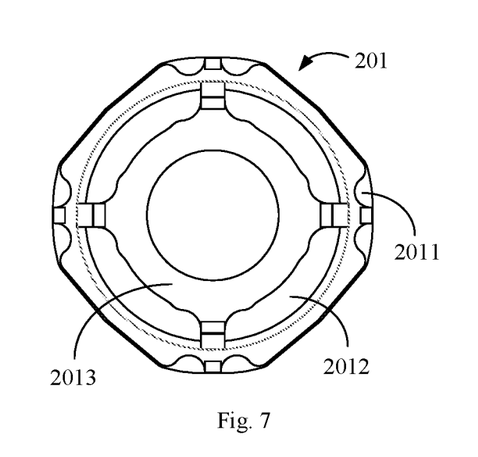
FIG. 7 is a top view of a liquid lens according to an embodiment of the disclosure.

In the embodiment, in order to connect the second mounting seat 331 to the liquid lens 201, the second mounting seat 331 may include a plurality of bosses 3312 extending from the second enclosure wall 3311 toward a direction away from the bottom of the seat body 1, the plurality of bosses 3312 are uniformly arranged around the first direction, and each of the bosses 3312 is connected to the liquid lens 201. Under the combined action of the plurality of uniformly arranged bosses 3312, stress uniformity of the liquid lens 201 may be improved, and mounting deformation of the liquid lens 201 is avoided. As shown in FIG. 7, the liquid lens 201 may include a fixing frame 2011, a diaphragm 2012, and a moving blade 2013, the diaphragm 2012 is connected to the fixing frame 2011, liquid or gas is capable of being arranged between the diaphragm 2012 and the fixing frame 2011, the moving blade 2013 is connected to the diaphragm 2012, and the moving blade 2013 is further connected to the boss 3312 of the second mounting seat 331. When the second mounting seat 331 moves toward or away from the liquid lens 201 in the first direction, the boss 3312 can be utilized to push or pull the moving blade 2013 to move, so as to cause gaseous flow between the fixing frame 2011 and the diaphragm 2012 and deformation, so as to adjust the curvature of the liquid lens 201.

In order to stably move the second mover assembly 33, an even number of stator magnets 2 may be arranged opposite to each other two-by-two, the second electrically conductive coil 332 is located between two stator magnets 2 opposite each other, and for example, in FIG. 4, the second electrically conductive coil 332 is located between the first stator magnet 21 and the third stator magnet 23, and between the second stator magnet 22 and the fourth stator magnet 24. When the second electrically conductive coil 332 is energized, the stator magnets 2 opposite each other interact with the second electrically conductive coil 332 to generate acting forces in the same direction, so that the second mover assembly 33 stably moves in the first direction, and the second mover assembly 33 is prevented from being inclined, so as to avoid affecting a photographing effect.

Apart from an acting force in the first direction, under an action between the stator magnet 2 and the second electrically conductive coil 332, an acting force perpendicular to the first direction may also be generated. In order to restrict the second mover assembly 33 from moving in the plane perpendicular to the first direction, the actuator 100 may include a first elastic member set 7 and a second elastic member set 8, the first elastic member set 7 includes a plurality of first elastic members 71, one end of each of the first elastic members 71 is connected to the second mounting seat 331, and the other end of each of the first elastic members 71 is connected to the seat body 1 in a direction perpendicular to the first direction. The second elastic member set and the first elastic member set are arranged at an interval in the first direction, the second elastic member set may include a plurality of second elastic members 81, one end of each of the second elastic members 81 is connected to the second mounting seat 331, and the other end of each of the second elastic members is connected to the seat body 1 in a direction perpendicular to the first direction. For example, in the embodiment shown in FIG. 6, the first elastic member set 7 may include four first elastic members 71, and the second elastic member set 8 may include four second elastic members 81. Under the action of the four first elastic members 71 and the second elastic members 81, the component force perpendicular to the first direction generated through the stator magnet 2 and the second electrically conductive coil 332 may be absorbed, so as to prevent the second mover assembly 33 from moving in the plane perpendicular to the first direction.

In the embodiment shown in FIGS. 4-6, the actuator 100 may further include a Hall sensor 9. The Hall sensor 9 may be arranged on the coil circuit board 31, and the Hall sensor 9 may be connected, through a circuit integrated in the coil circuit board 31, to the driving chip 4, so that it may not be necessary to design pins on the driving chip 4 for supplying power to the Hall sensor 9 and communicating with the Hall sensor 9, so as to reduce the number of pins of the driving chip 4. The Hall sensor 9 is arranged on the coil circuit board 31 and may move along with the first mover assembly 32, so as to change a relative positional relation between the Hall sensor 9 and the stator magnet 2, and changing magnetic field strength sensed by the Hall sensor 9 accordingly. Thus, the driving chip 4 may determine, according to the magnetic field strength sensed by the Hall sensor 9, a relative positional relation between the stator magnet 2 and the first mover assembly 32. In order to send the magnetic field strength sensed by the Hall sensor 9 acquired by the driving chip 4 to an external processor to inform the external processor of a current relative positional relation between the stator magnet 2 and the first mover assembly 32, the driving chip 4 may further include a third pin and a fourth pin, the third pin and the fourth pin being capable of being led out of the actuator 100 for communication with the external processor.

It will be understood that since the first mover assembly 32 moves in the plane perpendicular to the first direction, a position of the first mover assembly 32 may be represented through displacement in two directions perpendicular to each other. In order to acquire displacement in two directions perpendicular to each other in the plane perpendicular to the first direction, the Hall sensor 9 may include a first Hall sensor 91 and a second Hall sensor 92. The first Hall sensor 91 and the second Hall sensor 92 are arranged each corresponding to one stator magnet 2, a magnetic pole arrangement direction of a stator magnet 2 corresponding to the first Hall sensor 91 being perpendicular to a magnetic pole arrangement direction of a stator magnet 2 corresponding to the second Hall sensor 92. Based on this, stator magnets 2 with the magnetic pole arrangement directions perpendicular to each other interact with corresponding first electrically conductive coils 311 to drive the first mover assembly 32 to displace in the two directions perpendicular to each other in the plane. In a movement process, magnetic field strength sensed by the first Hall sensor 91 and the second Hall sensor 92 changes, and a current position of the first mover assembly 32 may be acquired according to a change in magnetic field strength.

In some embodiments, one or more Hall sensors 9 of the actuator 100 may also be arranged on the second mover assembly 33 and are all connected to the driving chip 4. The one or more Hall sensors 9 may move along with the second mover assembly 33, so that the driving chip 4 may acquire the magnetic field strength sensed by the Hall sensor 9 and determine a relative positional relation between the stator magnet 2 and the second mover assembly 33.

The embodiments described above are described on the premise that the actuator 100 shown in FIGS. 4-6 includes the Hall sensor 9. Actually, the actuator 100 in the embodiment shown in FIGS. 2-3 may also include one or more Hall sensors 9. The one or more Hall sensors 9 may also be arranged on the coil circuit board 31, and each Hall sensor 9 may be connected, through an internal circuit of the coil circuit board 31, to the driving chip 4, so as to make the driving chip 4 to determine the relative positional relation between the stator magnet 2 and the first mover assembly 32.

In the embodiments described above, in order to connect the driving chip 4 to the external power supply circuit, the driving chip 4 may further include a fifth pin and a sixth pin. The fifth pin may be connected to a positive electrode of the external power supply circuit, and the sixth pin may be connected to a negative electrode of the external power supply circuit, thus inputting, through the fifth pin, an electric signal of the external power supply circuit, and outputting, through the sixth pin, same. For example, in the embodiment shown in FIGS. 4-6, the driving chip 4 may include the first pin and the second pin which are connected to the second electrically conductive coil 332, the third pin and the fourth pin which are connected to the Hall sensor 9, and the fifth pin and the sixth pin which are connected to the external power supply circuit. In other words, in the embodiments shown in FIGS. 4-6, six pins are led out of the driving chip 4 to the outside of the actuator 100, that is, the focusing function and the anti-shaking function of the camera module 200 configured with the actuator 100 and closed-loop feedback in the anti-shaking process may be realized. Compared with the related art that a driving chip 4 is located on an external circuit board, with a total of 14 pins, including two pins for a second electrically conductive coil 332, two pins for each of two first electrically conductive coils 311 radially perpendicular to each other, and four pins for each of two Hall sensors 9 during anti-shaking are led out of an actuator 100, the number of pins of the driving chip 4 may be reduced.

In the embodiments described above, the fixing frame 2011 of the liquid lens 201 may be fixedly connected with the seat body 1, and the seat body 1 may include a cover body 11 and a base 12. The cover body 11 may include an accommodating cavity 111, and the base 12 is assembled to the cover body 11 to seal the accommodating cavity 111. The stator magnet 2, the mover assembly 3, and the driving chip 4 are all located in the accommodating cavity 111 sealed by the base 12. The base 12 may include a clamping part 121, and the clamping part 121 may be clamped with the stator magnet 2, thus fixedly connecting the stator magnet 2 to the seat body 1, omitting a special support for the stator magnet 2, and simplifying an internal structure of the actuator 100. The liquid lens 201 may be connected to the inner wall of the seat body 1, or the seat body 1 may further include a fixing support 13. The fixing support 13 is connected to the cover body 11, the liquid lens 201 is assembled in the fixing support 13, and the fixing frame 2011 of the liquid lens 201 is connected to the fixing support 13, thus assembling the liquid lens 201 to the seat body 1.

Based on the technical solution of the disclosure, the disclosure further provides an electronic device. The electronic device may include one or more of the camera modules 200 in the embodiments described above, and acquire, through the camera module 200, image information.

Those skilled in the art could easily conceive of other implementation solutions of the disclosure upon consideration of the description and the contents disclosed in the implementations described herein. The disclosure is intended to cover all variations, uses or adaptive changes of the disclosure, which follow the general principles of the disclosure and include common general knowledge or conventional technical means, which is not disclosed in the disclosure, in the art. The description and the embodiments are to be regarded as exemplary, and the scope of the disclosure are indicated by the following claims.

It should be understood that the disclosure is not limited to a precise structure which has been described above and illustrated in the accompanying drawings, and may have various modifications and changes without departing from the its scope. The scope of the disclosure is limited by the claims.

What is claimed is:

1. An actuator, comprising:
a seat body;
a stator magnet that is in the seat body and is connected to the seat body;
a mover assembly, comprising:
  a coil circuit board-that includes a first electrically conductive coil
  a first mover assembly configured to position a solid-state lens, wherein the stator magnet interacts with the first electrically conductive coil to drive the first mover assembly to translate in a reciprocating manner in a plane perpendicular to a first direction or to drive the first mover assembly to move in the reciprocating manner in the first direction,
  a second mover assembly configured to position a liquid lens, wherein the second mover assembly includes a second electrically conductive coil that when energized interacts with the stator magnet to drive the second mover assembly to translate in the reciprocating manner in the first direction; and
  a driving chip that is located on the coil circuit board and is connected to the first electrically conductive coil and the second electrically conductive coil, wherein the driving chip is configured to connect to an external power supply circuit to supply power to the first electrically conductive coil and the second electrically conductive coil.

2. The actuator according to claim 1, wherein ly, the first mover assembly comprises a first mounting seat movably arranged in the seat body, the coil circuit board is arranged on the first mounting seat around the first direction and faces any end, in the first direction, of the stator magnet;
the first mounting seat configured to fix the solid-state.

3. The actuator according to claim 2, wherein:
the stator magnet comprises a plurality of stator magnets that are arranged at intervals around the first direction,
the coil circuit board comprises a plurality of first electrically conductive coils,
the plurality of the stator magnets are in one-to-one correspondence with the plurality of first electrically conductive coils; and magnetic pole arrangement directions of the plurality of the stator magnets are perpendicular to the first direction, axial directions of the first electrically conductive coils are parallel to the first direction, and the plurality of the stator magnets interact with one or more of plurality of the first electrically conductive coils to drive the first mover assembly to translate in the reciprocating manner in the plane perpendicular to the first direction.

4. The actuator according to claim 3, wherein at least two of the plurality of stator magnets have magnetic pole arrangement directions perpendicular to each other.

5. The actuator according to claim 3, further comprising:
an elastic member, comprising an enclosure body and a plurality of elastic arms extending from the enclosure body, and the enclosure body is connected to the first mounting seat; and
a plurality of suspension wires arranged in the first direction, one end of each of the suspension wires is connected to one end, away from the enclosure body, of any of the elastic arms, and the other end of each of the suspension wires is connected to the seat body.

6. The actuator according to claim 2, wherein the second mover assembly comprises a second mounting seat and the second electrically conductive coil connected to the second mounting seat, the second mounting seat is configured to connect to the liquid lens.

7. The actuator according to claim 6, wherein the second electrically conductive coil comprises a first lead end and a second lead end, the driving chip comprises a first pin and a second pin, the first pin is connected to the first lead end, and the second pin is connected to the second lead end.

8. The actuator according to claim 6, wherein the second mounting seat comprises a second enclosure wall, the second enclosure wall is arranged around a part of the first mounting seat, the second electrically conductive coil is arranged around an outer side of the second enclosure wall, the stator magnet comprises a plurality of stator magnets that are arranged on one side, away from the second enclosure wall, of the second electrically conductive coil, and an axial direction of the second electrically conductive coil is parallel to the first direction.

9. The actuator according to claim 8, wherein an even number of the plurality of the stator magnets are arranged and are opposite to each other two by two, and the second electrically conductive coil is between the two opposite stator magnets.

10. The actuator according to claim 6, wherein the second mounting seat comprises a second enclosure wall and a plurality of bosses, the plurality of bosses extend from the second enclosure wall towards a direction away from a bottom of the seat body and are uniformly arranged around the first direction, and each of the bosses is connected to the liquid lens.

11. The actuator according to claim 6, further comprising:
a first elastic member set, comprising a plurality of first elastic members, one end of each of the plurality of the first elastic members is connected to the second mounting seat, and the other end of each of the plurality of the first elastic members is connected to the seat body in a direction perpendicular to the first direction; and
a second elastic member set, the second elastic member set and the first elastic member set being arranged at an interval in the first direction, the second elastic member set comprising a plurality of second elastic members, one end of each of the plurality of the second elastic members is connected to the second mounting seat, and the other end of each of the plurality of the second elastic members is connected to the seat body in a direction perpendicular to the first direction.

12. The actuator according to claim 2, wherein the first mounting seat comprises a first enclosure wall and an extension part extending outwards from the first enclosure wall, the first enclosure wall is configured to enclose the solid-state lens and connected to the solid-state lens, and the coil circuit board and the extension part are stacked.

13. The actuator according to claim 2, further comprising a Hall sensor, the Hall sensor is located on the coil circuit board and is connected to the driving chip, and
the driving chip is used for acquiring magnetic field strength sensed by the Hall sensor to obtain a relative positional relation between the stator magnet and the first mover assembly.

14. The actuator according to claim 13, wherein the driving chip comprises a third pin and a fourth pin, and the third pin and the fourth pin are used for establishing communication between the Hall sensor and an external processor.

15. The actuator according to claim 13, wherein the stator magnet interacts with the first electrically conductive coil to drive the mover assembly to translate in a reciprocating manner in a plane perpendicular to the first direction; and
the Hall sensor comprises a first Hall sensor and a second Hall sensor, the first Hall sensor and the second Hall sensor each corresponding to one stator magnet, a magnetic pole arrangement direction of the stator magnet corresponding to the first Hall sensor being perpendicular to that of the stator magnet corresponding to the second Hall sensor.

16. The actuator according to claim 2, wherein:
the stator magnet comprises a plurality of stator magnets that are arranged at intervals around the first direction, the coil circuit board comprises a plurality of first electrically conductive coils, and the plurality of the stator magnets are in one-to-one correspondence with the plurality of first electrically conductive coils; and
magnetic pole arrangement directions of the plurality of the stator magnets are parallel to the first direction, axial directions of the first electrically conductive coils are parallel to the first direction, and the plurality of the stator magnets interact with one or more of the first electrically conductive coils to drive the first mover assembly to move in a reciprocating manner in the first direction.

17. The actuator according to claim 1, wherein the driving chip comprises a fifth pin and a sixth pin, the fifth pin is used for connecting to a positive electrode of the external power supply circuit, and the sixth pin is used for connecting to a negative electrode of the external power supply circuit.

18. The actuator according to claim 1, wherein the seat body comprises:
a cover body, comprising an accommodating cavity; and
a base that is connected to the cover body to seal one end of the accommodating cavity, the mover assembly and the stator magnet are both in the accommodating cavity sealed by the base, the base comprises a clamping part, and the clamping part is clamped with the stator magnet.

19. A camera module, comprising:
an actuator, comprising:
a seat body;
a stator magnet that is in the seat body and is connected to the seat body;
a mover assembly comprising:
a coil circuit board that includes a first electrically conductive coil,
a first mover assembly, wherein the stator magnet interacts with the first electrically conductive coil to drive the first mover assembly to translate in a reciprocating manner in a plane perpendicular to a first direction or to drive the first mover assembly to move in the reciprocating manner in the first direction, and
a second mover assembly that includes a second electrically conductive coil, wherein the second electrically conductive coil when energized interacts with the stator magnet to drive the second mover assembly to translate in the reciprocating manner in the first direction;
a driving chip that is located on the coil circuit board and is connected to the first electrically conductive coil and the second electrically conductive coil, wherein the driving chip is configured to an external power supply circuit to supply power to the first electrically conductive coil and the second electrically conductive coil;
a solid-state lens, assembled on the seat body of the actuator and connected to the first mover assembly; and
a liquid lens assembled on the seat body of the actuator and connected to the second mover assembly.

20. An electronic device, comprising a camera module, the camera module comprises:
an actuator, comprising:
a seat body;
a stator magnet that is in the seat body and is connected to the seat body;
a mover assembly comprising:
a coil circuit board that includes a first electrically conductive coil,
a first mover assembly, wherein the stator magnet interacts with the first electrically conductive coil to drive the first mover assembly to translate in a reciprocating manner in a plane perpendicular to a first direction or to drive the first mover assembly to move in the reciprocating manner in the first direction, and
a second mover assembly that includes a second electrically conductive coil, wherein the second electrically conductive coil when energized interacts with the stator magnet to drive the second mover assembly to translate in the reciprocating manner in the first direction;
a driving chip that is located on the coil circuit board and is connected to the first electrically conductive coil and the second electrically conductive coil, wherein the driving chip is configured to an external power supply circuit to supply power to the first electrically conductive coil and the second electrically conductive coil;
a solid-state lens assembled on the seat body of the actuator and connected to the first mover assembly; and
a liquid lens assembled on the seat body of the actuator and connected to the second mover assembly.

\* \* \* \* \*

UNITED STATES PATENT AND TRADEMARK OFFICE
CERTIFICATE OF CORRECTION

PATENT NO. : 11,895,384 B2
APPLICATION NO. : 17/587221
DATED : February 6, 2024
INVENTOR(S) : Wang et al.

It is certified that error appears in the above-identified patent and that said Letters Patent is hereby corrected as shown below:

On the Title Page

Item [57], delete "seat body" and insert -- seat body, --, therefor.

In the Specification

Column 2, Lines 59-60, delete "there between." and insert -- therebetween. --, therefor.

Column 4, Line 41, delete "can" and insert -- can be --, therefor.

Column 11, Line 24, delete "the its" and insert -- its --, therefor.

In the Claims

Column 11, Line 33, in Claim 1, delete "coil" and insert -- coil, --, therefor.

Column 11, Line 54, in Claim 2, delete "wherein ly," and insert -- wherein, --, therefor.

Column 14, Line 26, in Claim 19, delete "lens," and insert -- lens --, therefor.

Signed and Sealed this
Second Day of April, 2024

Katherine Kelly Vidal
*Director of the United States Patent and Trademark Office*